United States Patent [19]
Furey, deceased

[11] Patent Number: 5,222,455
[45] Date of Patent: Jun. 29, 1993

[54] SHIP WAKE VORTICITY SUPPRESSOR

[75] Inventor: Roger J. Furey, deceased, late of Vienna, Va., by Suzanne E. Furey, administratrix

[73] Assignee: The United States of America as represented by the Secretary of the Navy, Washington, D.C.

[21] Appl. No.: 870,082

[22] Filed: Apr. 17, 1992

[51] Int. Cl.$^5$ .................. B63B 38/00; B63G 13/02
[52] U.S. Cl. .................................. 114/270; 114/15
[58] Field of Search .................. 114/67 R, 67 A, 15, 114/151, 270; 440/39, 40, 42, 47

[56] References Cited

U.S. PATENT DOCUMENTS

| | | | |
|---|---|---|---|
| 1,747,817 | 2/1930 | Choquette | 440/47 |
| 2,401,583 | 6/1946 | Redfield et al. | 114/15 |
| 2,699,644 | 1/1955 | Coanda | 114/67 R |
| 2,954,750 | 10/1960 | Crump et al. | 114/67 R |
| 3,020,872 | 2/1962 | Gierczic | 440/42 X |
| 3,339,516 | 9/1967 | Lenci | 440/39 |
| 3,374,971 | 3/1968 | Heskestad | 244/209 |
| 4,086,867 | 5/1978 | Stricker et al. | 440/47 |
| 4,395,965 | 8/1983 | Lang | 114/20 |
| 4,993,663 | 2/1991 | Lahti et al. | 244/209 |

OTHER PUBLICATIONS

"Hydrodynamic Stability and Vorticity in a Ship--Model Wake", Roger J. Furey, Feb. 1990.
"A Free-Surface Vorticity Layer Model of the Ships Wake", Roger J. Furey, Aug. 1989.

Primary Examiner—Sherman Basinger
Attorney, Agent, or Firm—Gary G. Borda

[57] ABSTRACT

In accordance with the present invention, a device to suction off the portion of the boundary layer closest to the hull and expel it alongside the ship is provided. The invention comprises a casing mounted in substantially parallel spaced alignment to the ship hull for diverting the portion of the ship boundary layer in immediate proximity to the underwater hull, at least one pump in communication with the casing for drawing up water from the ship boundary layer that enters into the casing, and at least one outlet nozzle in communication with the pump for expelling the water alongside the hull. The invention removes the portion of the fluid with the highest concentration of vorticity thereby removing the mechanism by which the "inverse bubbles" and floating drops persist far downstream of the ship's stern and thus suppressing the source of the most detectable features of the ship's wake radar image.

11 Claims, 2 Drawing Sheets

SHIP WAKE VORTICITY SUPPRESSOR

STATEMENT OF GOVERNMENT RIGHTS

The invention described herein may be manufactured and used by or for the the Government of the United States of America for governmental purposes without the payment of any royalties thereon or therefor.

BACKGROUND OF THE INVENTION

1. Field of Invention

The present invention relates generally to ship wake reduction and, more particularly, to suppressing the visibility of a ship's wake by removing the portion of the boundary layer that produces the easily detected radar image ordinarily associated with the ship's wake.

2. Brief Description of Related Art

The structure of a ship's centerline viscous wake has recently been the subject of considerable interest and study. This interest arises because of the distinctive features visible in the image of the ship's wake obtained from an airborne or earth orbiting synthetic aperture radar (SAR) and from the infrared (IR) signature of the ship's surface wake.

Airborne or earth orbiting synthetic aperture radar (SAR) will, under normal circumstances, detect the surface wake produced by the passage of a ship along the surface of the water. Surface wakes, which trail all surface ships, often extends for many miles behind the ship. The examination of the SAR images of ship wakes reveal a number of features that are common to all surface ship wakes. The usually observed features include a narrow dark band, often extending many miles directly behind the ship, with a bright and gradually expanding border.

David Taylor Research center reports DTRC/SESD-89/05 entitled "A Free-Surface Vorticity Layer Model of the Ships Wake," by Roger J. Furey (August 1989) and DTRC 90/005 entitled "Hydrodynamic Stability and Vorticity in a Ship-Model Wake," by Roger J. Furey (February 1990), incorporated herein by reference, explain how the ship-generated vorticity, noted for its persistence, and the inverse bubble/floating drop structure of the ship's free-surface wake layer are the source of the long-lasting features of the various wake signatures.

A basic rule pertaining to vorticity is that the vorticity moves with the fluid. Consequently, the vorticity generated in the momentum thickness portion of the ship's "thin" boundary layer persists into the surface layer in the ship's track. The references show that, although the ship's viscous wake extends to a depth comparable to the ship's draft, there is a concentration of vorticity, comparable in thickness to the momentum thickness portion of the ship's thin boundary layer, which persists into the ship's wake in the form of a free-surface vorticity layer. The free-surface vorticity layer, which is characterized by its "constant" vorticity, and thereby its rotation, is the most significant characteristic of the viscous wake with respect to free-surface effects.

The free-surface vorticity layer and its interaction with the transverse waves of the ship's Kelvin wake are shown to account for many of the observed features of the wake radar image. The transverse waves of the ship's Kelvin wake provide a low frequency disturbance to the vorticity, stretching the free-surface vorticity layer and generating Rossby waves along the edges. Full-scale ship observations demonstrate that the mechanism of Rossby wave production accounts for Bragg scattering in the SAR imaging in the X-band near the ship's stern through the L-band as the layer moves downstream, thereby accounting for the observed narrow-angle bright lines of the wake's radar image.

The rotational aspects of the free-surface vorticity layer lead to a strong two-dimensional tendency about its rotational axis. Additionally, the energy in the vorticity layer does work on the free-stream which results in an enhanced surface tension and in the absorption of the solutes in the fluid. In the past, it has been believed that the two-dimensional character of the layer, and its structure due to absorption, produce specular reflection of incident SAR waves in the body of the layer away from the direction of the source (and receiver) resulting in no return signal and explaining the dark band in the imagery. However, studies conducted by the inventor, and detailed in the incorporated references, provide a more feasible explanation of the ship wake's dark band radar image.

During monitoring of towing tank model experiments on a scaled ship-model, it was noted that the reflection from the water surface of a directed light beam was quite different within and outside the bounds of the upwelling flow, emanating from the model stern, that makes up the surface of the ship's viscous wake. Within the bounds of the viscous wake, the image of the light did not appear to penetrate the surface layer, but appeared to stop at the surface layer with near total reflection of the light. Outside the bounds of the viscous wake, the light beam penetrated the water to the bottom of the tank. Based on the index of refraction of water, the reflected intensity is expected to be near 2 percent of the incident light. This value correlates with what was observed outside the region of upwelling flow. However, the seemingly total reflection of light within the bounds of the viscous wake was unexpected and is not readily explained by thermodynamic analysis of the quasi-equilibrium state of the surface wake.

Through his analyses, the inventor has determined that the reflecting surface is explained by the generation of drops in the upwelling flow in the model wake. Total reflection of light at an interface between dielectrics can occur when the light beam passes from a medium of given optical density to one of lower density. The passage of light from water to air, such a through a water drop, is such a case. Closed shells of fluid, such as gas shells sometimes known as "inverse bubbles," and floating drops can be produced in a fluid by a number of mechanisms, all of which are present in the upwelling flow at the stern of a ship. A characteristic of these "inverse bubbles" and floating drops is that they appear silvery due to the near total reflection of light. The silvery, bright light patch on the free-surface in the model's wake can be explained by this phenomena.

Three mechanisms have been identified as means of producing floating drops and "inverse bubbles": (1) the break-up of a water jet, (2) rising bubbles subjected to turbulence to form gas shells, and (3) the rupture of rising bubbles on breaking the free-surface. These mechanisms for producing floating drops and "inverse bubbles" can all be found in the upwelling flow at the stern of a ship. Drop production in the upwelling flow at the immediate stern can be related to the break-up of a water jet. The fluid closest to the hull is analogous to that on the periphery of the jet and is thus most likely to break into drops before reaching the peak of the upwelling, i.e., the crest of the first transverse wave behind the ship. This fluid, in transition to the free-surface, has the greatest vorticity. Thus, according to Kelvin's minimum energy theorem, the minimum pressure and maximum velocity will occur here. Additionally, this fluid layer is most susceptible to hull vibrations which may be a significant factor in the break-up of the flow into drops.

Vorticity is greatest in what is initially the laminar sub-layer of the ship's thin boundary layer. The laminar sub-layer subsequently becomes the free-surface vorticity layer at the free-surface/air-water interface of the ship's wake. As stated earlier, a basic rule pertaining to vorticity is that the vorticity moves with the fluid. Therefore, the fluid originating in the laminar sub-layer, upon forming "inverse bubbles" and floating drops at the free-surface interface, retains this maximum vorticity. Consequently, once formed, the "inverse bubbles" and floating drops persist for the duration of the vorticity, thus persisting far downstream in the ship's wake. Thus, the vorticity accounts for the long life of the "inverse bubbles" and floating drops in the viscous wake of a ship.

The existence of "inverse bubbles" in the ship-model wake accounts for the unique manner in which light is reflected from the surface wake behind the ship-model. Furthermore, the retention of vorticity by the "inverse bubbles" provides the mechanism by which the bubbles persist far downstream of the ship's stern. Thermodynamic analysis and observation of the ship's wake indicate increased surface tension and reduced surface temperature in the ship's surface wake. The increased surface tension and reduced surface temperature of the ship's wake are compatible with the physical model of the wake which incorporates these vorticity-retaining "inverse bubbles".

The most notable feature of the SAR image of a ship's wake, the often miles-long dark band directly in the ship's track, is usually attributed to specular reflection of the incident electromagnetic (E-M) waves in the microwave range away from the direction of the source (and receiver) such that no return is associated with that segment of the field of view. The vorticity-retaining "inverse bubbles" model of the surface wake provides a more feasible explanation of the dark band feature.

The inverse bubble/floating drop structure of a ship's surface wake layer, which produces near total reflection of incident visible light, has a different effect when the incident E-M waves are in the microwave range as in the case of incident SAR waves. When the reflective film thickness is much less than the wavelength of the incident E-M waves, a destructive interference can be established such that no return is observed. Although the film thickness of a ship's free-surface vorticity layer may well appear large in relation to the angstroms-long wavelengths of visible light, it appears small in relation to the centimeters-long wavelengths of the microwave region. Thus a destructive interference can be established within the surface layer of the ship's viscous wake. Dielectrics such as water, on the other hand, have a tendency to absorb E-M energy. Salt-water absorbs considerably more E-M energy than fresh-water. However, thermodynamic analysis indicates that the surface layer in a ship's viscous wake is less concentrated in salts than is the water outside the wake. Thus, absorption of E-M energy in this layer is closer to that of fresh water and, consequently, sufficient energy is reflected to produce destructive interference in the ship's wake. Such interference would not result outside the ship's wake. Therefore, the vorticity-retaining "inverse bubble" structure associated with the thin surface wake layer provides a mechanism for producing the dark band in the SAR image regardless of its orientation to the SAR.

The SAR image produced by the ship's wake contributes to easy monitoring of ship traffic at sea. Based on the mission of a particular ship, it may be desirable under certain circumstances to eliminate the easily detectable ship wake. At present, Navy ship's do not possess this capability. The fundamental understanding of the surface flow in the ship's wake provided by the aforementioned reports has lead to the present invention's suppression of tell-tale signs of the wake's SAR imagery.

SUMMARY OF THE INVENTION

The operation of the ship wake vorticity suppressor is based on the the fact that the concentrated vorticity, i.e., the rotational motion in the fluid, and the inverse bubble/floating drop structure of the ship's surface wake layer generated by the underwater hull of a ship moving through the fluid are the source of the major downstream features of the ship's wake radar image. Removing or suppressing these features from the wake thereby eliminates the downstream effects that contribute the most notable features of the ship's wake radar image.

In accordance with the present invention, a device to suction off the portion of the boundary layer closest to the hull and expel it alongside the ship is provided. In so doing, the invention removes the portion of the fluid with the highest concentration of vorticity thereby removing the mechanism by which the "inverse bubbles" and floating drops persist far downstream of the ship's stern and thus suppressing the source of the most detectable features of the ship's wake radar image.

The ship wake vorticity suppressor comprises a flow diverting means, a pumping means and a discharge means. The flow diverting means is mounted to the ship hull for diverting the portion of the ship boundary layer in immediate proximity to the underwater hull into the pumping means which is in communication with the flow diverting means. The pumping means is operative for pumping the water from the ship boundary layer that has entered into the flow diverting means to the discharge means which is in communication with said pumping means. The discharge means is operative for expelling the water drawn into the pumping means from the flow diverting means to a point alongside the hull.

OBJECTS OF THE INVENTION

Accordingly, it is an object of the present invention to provide a device that will suppress the most readily detectable features of the ship wake.

It is a further object of the present invention to provide an apparatus that will decrease surface ship susceptibility to detection by airborne or earth orbiting radar.

It is still a further object of the present invention to provide a device that will increase the stealthiness of a surface ship.

Other objects and advantages of the present invention will become apparent to those skilled in the art upon a reading of the following detailed description taken in conjunction with the drawings and the claims supported thereby.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein.

DETAILED DESCRIPTION OF THE PREFERRED EMBODIMENT

Figure 1:
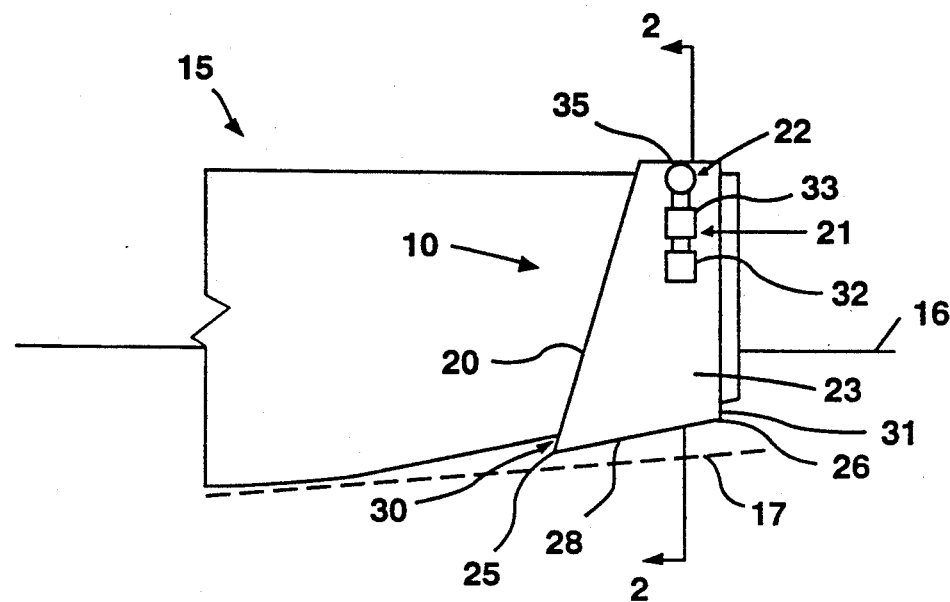
FIG 1. is a profile view of the stern portion of a ship hull including one embodiment of the invention.
Figure 2:
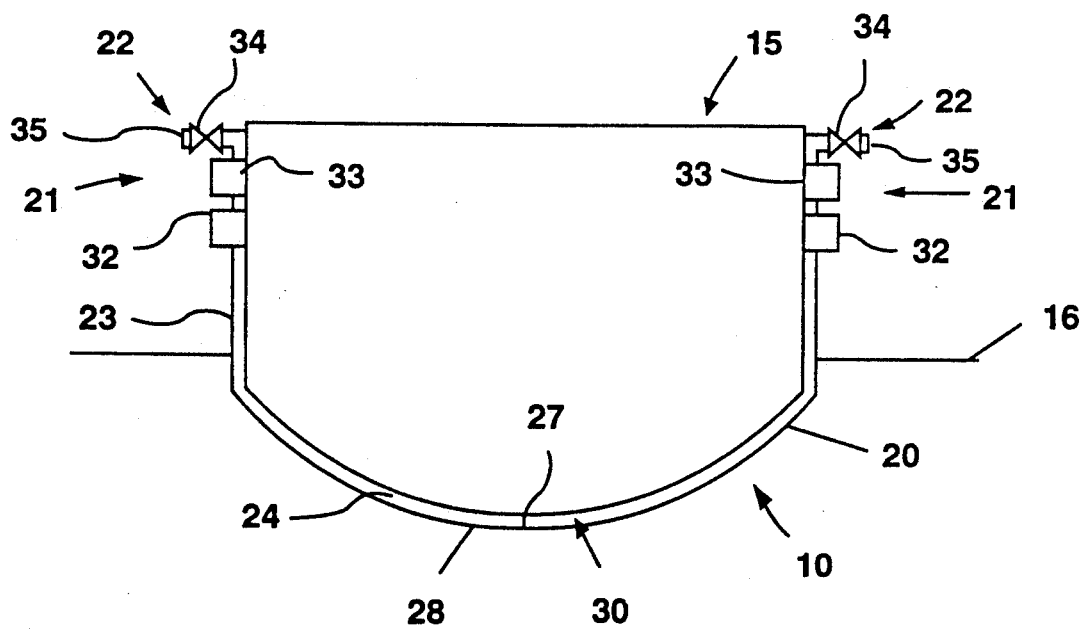
FIG 2. is a sectional view of the invention along line 2—2 of FIG. 1.

Referring now to the drawings, and particularly to FIG. 1 and FIG. 2, ship wake vorticity suppressor 10 is shown mounted to the stern portion of a ship hull 15. The ship waterline and ship generated boundary layer are indicated generally by items 16 and 17, respectively. The ship centerline is shown as item 18 of FIG. 3. Ship wake vorticity suppressor 10 generally comprises flow diverting means 20 mounted in spaced alignment with and spanning the underwater stern portion of ship hull 15, pumping means 21 in flow communication with flow diverting means 20 and operative for drawing water entering flow diverting means 20 while the ship is moving forward into the inlet or suction side of pumping means 21, and discharge means 22 located above ship waterline 16 and in flow communication with the outlet or pressure side of pumping means 21. Flow diverting means 20, pumping means 21, and discharge means 22 are interconnected so as to be in flow communication by, for example, such well known interconnecting means as conduits, pipes, tubes, hoses, or any other suitable means for transporting a fluid.

It is well understood that for a ship to have a boundary layer and a trailing viscous surface wake, the ship must be moving forward through the water. Furthermore, it is inherent in the structure and operation of ship wake vorticity suppressor 10 that, when the ship is moving forward through the water, a portion of the water flowing aft along the ship hull will enter flow diverting means 20 under a pressure associated with the ship's forward speed. During operation of ship wake vorticity suppressor 10, pumping means 21 creates suction within flow diverting means 20 whereupon water is drawn into pumping means 21 from the portion of the ship boundary layer in immediate proximity to the underwater hull which enters flow diverting means 20. Flow diverting means may be constructed out of a strong composite material, such as graphite reinforced plastic composite material, or any other strong and stiff lightweight composite or metal. The water entering flow diverting means 20 passes through pumping means 21 into discharge means 22, which is in communication with pumping means 21, where it is expelled to a location alongside the stern portion of ship hull 15. The operation of ship wake vorticity suppressor 10 results in the portion of boundary layer 17 that contains the highest concentration of vorticity being diverted from its natural flow streamlines below the ship hull and being expelled to a point outboard of the ship stern. In so doing, ship wake vorticity suppressor 10 prevents this highly vorticity concentrated portion of the flow from forming the free-surface vorticity layer portion of the ship's trailing wake. Consequently, ship wake vorticity suppressor 10 eliminates the mechanism which causes the "inverse bubbles" and floating drops in the ship wake to persist far downstream of the ship's stern and, thereby, suppresses the source of the most detectable features of the ship's wake radar image.

As more clearly shown in FIG. 1 and FIG. 2, flow diverting mean 20 includes casing 23 mounted in a substantially parallel aligned semi-flush spaced relationship about the stern portion of ship hull 15. During operation, casing 23, which spans the underwater girth of the stern portion of ship hull 15 to a point above ship waterline 16, is located adjacent to but protruding from ship hull 15 thus forming a conduit 24 therebetween. Casing 23 has a leading edge 25, trailing edge 26, and inner and outer surfaces 27 and 28, respectively, extending axially between leading edge 25 and trailing edge 26. Casing 23 includes an opening at leading edge 25 that provides a continuous inlet 30 along the periphery of the ship's underwater hull between the inner surface 27 of casing 23 and ship hull 15. Casing 23 further includes wall portion 31 at trailing edge 26 that extends from inner surface 27 of casing 23 to ship hull 15 whereby casing 23 is closed at trailing edge 26.

Ship wake vorticity suppressor 10 also includes pumping means 21 and discharge means 22. Pumping means 21 includes at least one centrifugal pump 32. The inlet or suction side of centrifugal pump 32 is in flow communication with inlet 30 of flow diverting means 20 for creating suction within flow diverting means 20 to draw water entering into inlet 30. The outlet or pressure side of centrifugal pump 32 is in flow communication with discharge means 22 to expel the drawn in water from ship wake vorticity suppressor 10. Discharge means 22 includes at least one outlet nozzle 35. Inlet 30, pumping means 21, and discharge means 22 are interconnected so as to be in flow communication by, for example, such well known interconnecting means as conduits, pipes, tubes, hoses, or any other suitable means for transporting a fluid. Conduit 24 acts as a means to channel the flow from inlet 30 to the suitable interconnecting means.

As shown in FIG. 1 and FIG. 2, pumping means 21, in one preferred embodiment, includes two centrifugal pumps 32, wherein one pump is mounted to the port side of casing 23 and one pump is mounted to the starboard side of casing 23. Pumping means 21 may include less than two or more than two centrifugal pumps, or any other appropriate device for pumping fluids. Pumping means 21 may further include at least one flow meter 33 for measuring the rate of flow between pump 32 and discharge means 22. Pumping means 21 may also include at least one valve 34 for regulating the rate of flow between pump 32 and discharge means 22. Pumping means 21 will be controlled by an appropriate electric power source (not shown). In the embodiment of FIG. 1 and FIG. 2, two outlet nozzles 35, one mounted on the port side and one mounted on the starboard side of casing 23, are aligned transversely to ship centerline 18 (see FIG. 3) and are located vertically above ship waterline 16 to discharging water outboard of the ship beam.

Figure 3:
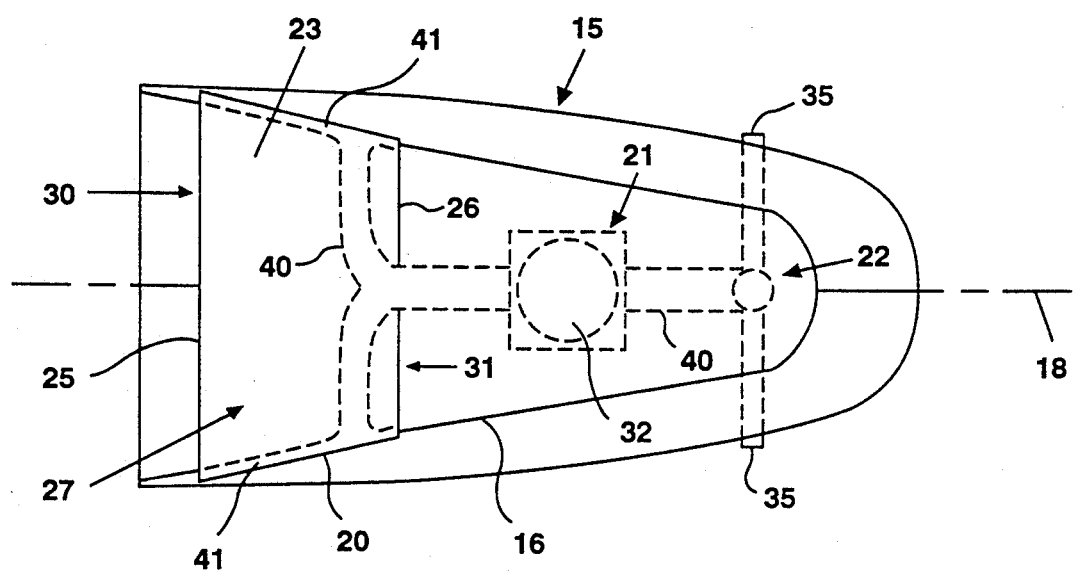
FIG. 3. is a plan view of the underside of the stern portion of a ship hull including an alternative embodiment of the invention.

In an alternative embodiment shown in FIG. 3, flow diverting means 20 includes casing 23 mounted in a substantially parallel aligned semi-flush spaced relationship about the stern portion of ship hull 15. Casing 23 includes leading edge 25, trailing edge 26, and inner and outer surfaces 27 and 28, respectively, extending axially between leading edge 25 and trailing edge 26. Casing 23 includes an opening at leading edge 25 that provides a continuous inlet 30 along the periphery of the ship's underwater hull between the inner surface 27 of casing 23 and the ship hull 15. Casing 23 further includes wall portion 31 at trailing edge 26 that extends from inner surface 27 of casing 23 to ship hull 15 whereby casing 23 is closed at trailing edge 26. Pumping means 21 includes one centrifugal pump 32. Interconnecting means 40, between casing 23 and centrifugal pump 32 and between centrifugal pump 32 and outlet nozzles 35 of discharge means 22, provides flow communication among inlet 30 of casing 23, centrifugal pump 32, and output nozzle 35. Interconnecting means 40 may include converging channel 41 to assist in channeling the flow entering opening 30 of casing 23 to centrifugal pump 32. Interconnecting means 40 may be, by way of example, a conduit, pipe, tube, hose, or any other suitable means for transporting a fluid.

Depending on the underwater length and speed of the ship upon which ship wake vorticity suppressor 10 is mounted and, therefore, upon the size of ship boundary layer 17, the height of inlet opening 30 can be from between 1 centimeter and 10 centimeters, when measured normal to the ship hull, in order to divert substantially only that portion of the viscous sub-layer of the ship boundary layer containing the highest concentration of vorticity. Generally, ship wake vorticity suppressor 10 need not extend longitudinally over a large area of the ship hull. In the preferred embodiment, the axial length of casing 23 between leading edge 25 and trailing edge 26 is less than 1 percent of the ship length.

Ship wake vorticity suppressor 10 will be deployed in an operable configuration when the ship mission makes it desirable to suppress the ship's SAR image. When the ship mission does not require suppression of the ship's SAR image, ship wake vorticity suppressor may be in a stowed configuration so that any flow resistance created by the device can be minimized. Therefore ship wake vorticity suppressor 10 may include means for moving said casing between a stowed position and an operable position. In one embodiment, ship wake vorticity suppressor 10 can be hinge mounted to rotate between a stowed position above the ship waterline and and operable position below the ship waterline using, by way of example, a motor and gear arrangement to produce rotational movement about pivot pins or other appropriate hinge joints. In an alternative embodiment, ship wake vorticity suppressor 10 can be track mounted to reciprocally project between a stowed position abutting the ship hull and an operable position in aligned spaced relationship to the ship hull using, by way of example, motor and gear arrangement to produce reciprocating movement along tracks.

The advantages of the present invention are numerous.

The invention provides a simple device for decreasing a surface ship's susceptibility to detection by airborne or earth orbiting synthetic aperture radar (SAR) while presenting a minimal frontal area to the flow, the frontal area being located substantially within the ship's boundary layer, thus causing a negligible increase in ship drag.

The invention can be deployed only when the ship's mission requires elimination of the ship's tell-tale SAR image thereby minimizing any resistance penalty thus conserving fuel.

Furthermore, the invention can be retrofit onto existing ships or incorporated into new ship designs at a minimal cost.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

What is claimed is:

1. A ship wake vorticity suppressor comprising:

flow diverting means mounted to a ship hull said flow diverting means having a forward facing inlet spanning at least the underwater periphery of the ship hull and operative for receiving water from the portion of the ship boundary layer in immediate proximity to the ship hull during forward movement of the ship;

pumping means in flow communication with said flow diverting means; and discharge means in flow communication with said pumping means for expelling the water drawn into said pumping means from said flow diverting means to a point alongside the hull wherein the concentrated layer of vorticity in the portion of the boundary layer in immediate proximity to the ship hull is diverted away from the ship's trailing viscous wake whereupon the formation of the free-surface vorticity layer of the ship trailing viscous wake is suppressed.

2. A ship wake vorticity suppressor as in claim 1, wherein said flow diverting means comprises:

a casing mounted in a substantially parallel aligned semi-flush spaced relationship about the stern portion of the ship hull to form a conduit therebetween;

said casing having a leading edge and a trailing edge and further having inner and outer surfaces extending axially between said leading and said trailing edges;

said casing being open at its leading edge, said opening providing said inlet along the periphery of the ship's underwater hull between said inner surface of said casing and the ship hull; and said casing further having a wall portion at its trailing edge extending from said inner surface of said casing to the ship hull whereby said casing is closed at its trailing edge wherein said casing is operative to divert water from the ship boundary layer to said pumping means during forward motion of the ship.

3. A ship wake vorticity suppressor as in claim 2, wherein said inlet has a height of between 1 cm and 10 cm when measured normal to the ship hull.

4. A ship wake vorticity suppressor as in claim 1, wherein said pumping means comprises:

at least one centrifugal pump, said centrifugal pump in flow communication with said inlet of said casing and with said discharge means;

at least one flow meter for measuring the rate of flow to said discharge means; and at least one valve for regulating the rate of flow to said discharge means.

5. A ship wake vorticity suppressor as in claim 4, wherein the number of centrifugal pumps is two and further wherein one of said pumps is mounted to the port side of said casing and one of said pumps is mounted to the starboard side of said casing.

6. A ship wake vorticity suppressor as in claim 1, wherein said discharge means comprises:
   at least one outlet nozzle, said outlet nozzle being aligned transversely with the ship centerline and located vertically above the ship waterline for discharging water outboard of the ship beam.

7. A ship wake vorticity suppressor as in claim 1, wherein said flow diverting means is made of a graphite reinforced plastic composite material.

8. A ship wake vorticity suppressor as in claim 1, wherein the axial length of said casing between said leading and said trailing edges is less than 1 percent of the ship length.

9. A ship wake vorticity suppressor comprising:
   a casing mounted in a substantially parallel aligned semi-flush spaced relationship about the stern portion of a ship hull to form a conduit therebetween;
   said casing having a leading edge and a trailing edge and further having inner and outer surfaces extending axially between said leading and said trailing edges;
   said casing having an axial length from said leading edge to said trailing edge of less than 1 percent of the ship length;
   said casing being open at its leading edge, said opening providing a continuous inlet along the periphery of the ship's underwater hull between said inner surface of said casing and the ship hull;
   said inlet having a height of between 1 cm and 10 cm when measured normal to the ship hull;
   said casing further having a wall portion at its trailing edge extending from said inner surface of said casing to the ship hull whereby said casing is closed at its trailing edge;
   at least one outlet nozzle, said at least one outlet nozzle being aligned transversely with the ship centerline and located vertically above the ship waterline;
   at least one pump located between said inlet and said outlet nozzle; and
   means interconnecting said inlet, said at least one pump, and said at least one outlet nozzle whereby said inlet, said at least one pump, and said at least one outlet nozzle are in flow communication such that, during forward movement of the ship hull, water located in the portion of the boundary layer in immediate proximity to the ship hull enters said conduit through said inlet, is pumped by said at least one pump through said interconnecting means and is discharged from said at least one outlet nozzle to a point outboard of the ship.

10. A ship wake vorticity suppressor as in claim 9, further comprising:
    at least one flow meter for measuring the rate of flow to said at least one outlet nozzle; and
    at least one valve for regulating the rate of flow to said at least one outlet nozzle.

11. A ship wake vorticity suppressor as in claim 10, wherein the number of centrifugal pumps is two and further wherein one of said pumps is mounted to the port side of said casing and one of said pumps is mounted to the starboard side of said casing.

* * * * *